United States Patent [19]

Kordts

[11] Patent Number: 5,000,048

[45] Date of Patent: Mar. 19, 1991

[54] CIRCUIT ARRANGEMENT FOR TEMPERATURE COMPENSATION OF CAPACITIVE PRESSURE AND DIFFERENTIAL PRESSURE SENSORS

[75] Inventor: Jürgen Kordts, Norderstedt, Fed. Rep. of Germany

[73] Assignee: U.S. Philips Corporation, New York, N.Y.

[21] Appl. No.: 411,340

[22] Filed: Sep. 22, 1989

[30] Foreign Application Priority Data

Sep. 24, 1988 [DE] Fed. Rep. of Germany ....... 3832568

[51] Int. Cl.$^5$ .......................... G01L 9/12; G01L 19/04
[52] U.S. Cl. ......................................... 73/708; 73/718; 73/724
[58] Field of Search .......................... 73/708, 718, 724; 361/283

[56] References Cited

U.S. PATENT DOCUMENTS 4,392,383  7/1983  Bauerlen et al. ...................... 73/718

FOREIGN PATENT DOCUMENTS 3340834  5/1985  Fed. Rep. of Germany.

Primary Examiner—Donald O. Woodiel
Attorney, Agent, or Firm—Bernard Franzblau

[57] ABSTRACT

A circuit arrangement for temperature compensation of capacitive pressure sensors and differential pressure sensors includes two measuring capacitors (1,2) which are arranged in respective feedback branches of two measuring integrators (3, 4). The capacitance values vary as a function of the pressure or differential pressure to be detected and are converted into measurement signals by the measuring interconnect. A negative feedback circuit is provided which comprises a Schmitt trigger circuit (5) which at least generates a temperature-dependent activation signal for the measuring integrators from a measurement signal.

17 Claims, 2 Drawing Sheets

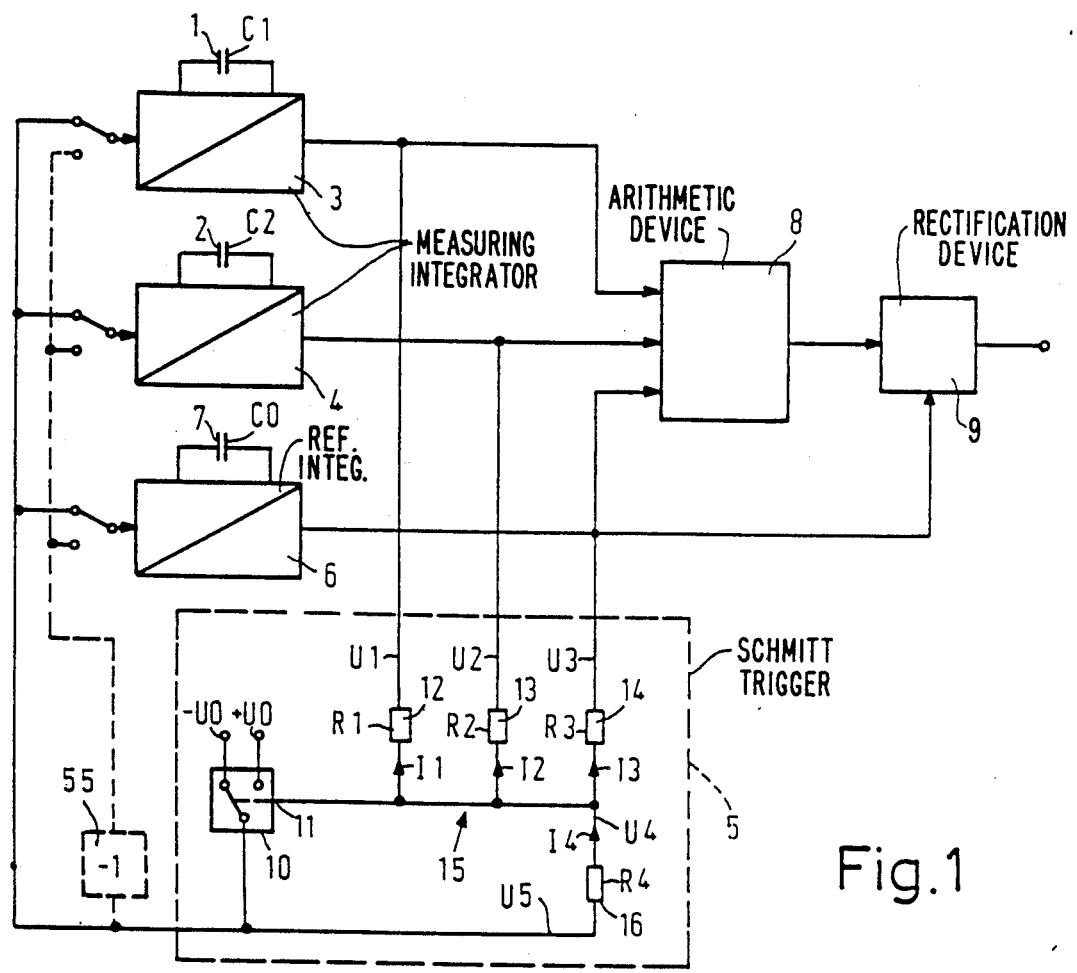
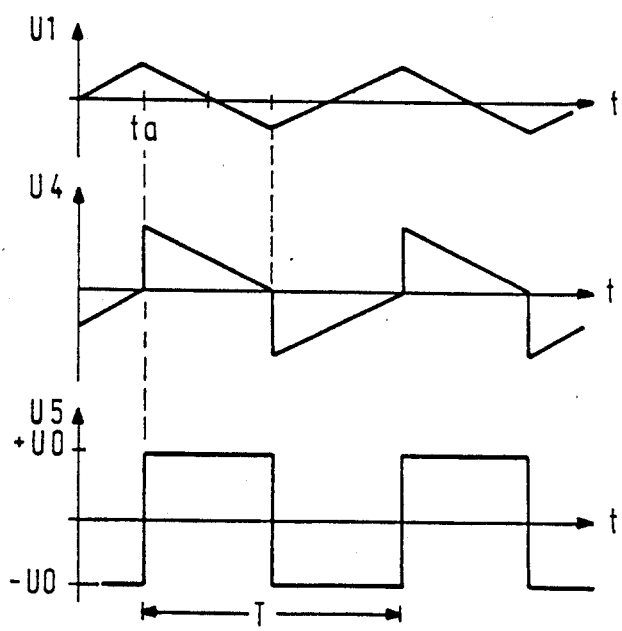
Fig.1
Fig.2

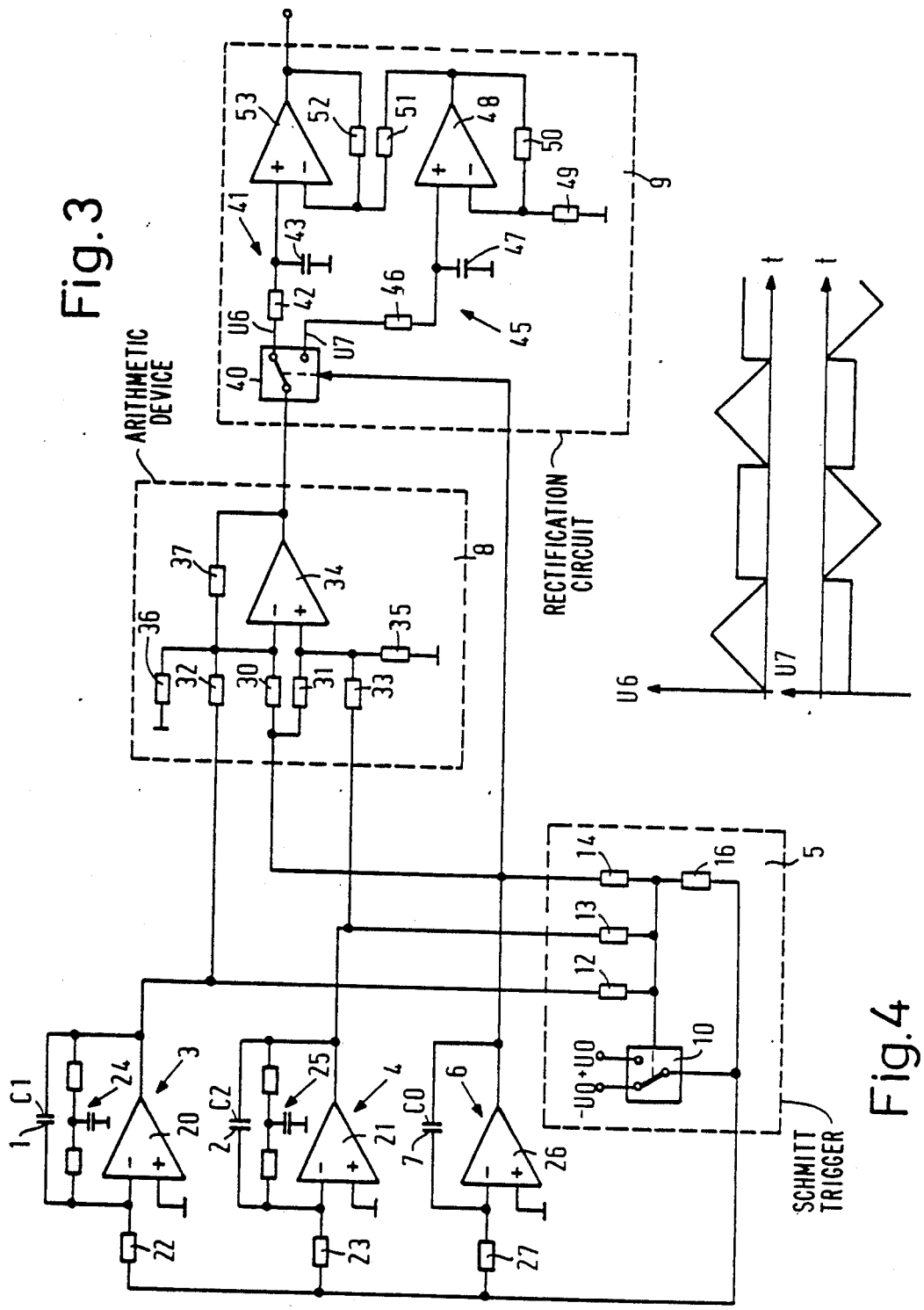

CIRCUIT ARRANGEMENT FOR TEMPERATURE COMPENSATION OF CAPACITIVE PRESSURE AND DIFFERENTIAL PRESSURE SENSORS

BACKGROUND OF THE INVENTION

This invention relates to a circuit arrangement for temperature compensation of capacitive pressure sensors and differential pressure sensors, comprising two measuring capacitors, each of which is arranged in a respective feedback branch of two measuring integrators and whose capacitance valves, which vary as a function of the pressure or differential pressure to be detected, are converted into measurement signals by the measuring integrators the circuit also comprises a negative feedback circuit which generates a temperature-dependent activation signal for the measuring integrators from at least one measurement signal.

A circuit arrangement of this kind, which compensates for the temperature effect during the measurement of the differential pressure of a differential pressure sensor, is known from DE-PS 33 40 834. Therein, a respective circuit arrangement for temperature compensation is described for a two-chamber differential pressure sensor and a single-chamber differential pressure sensor. The two-chamber differential pressure sensor comprises two measuring diaphragms which enclose a space filled with an incompressible liquid. This space is subdivided into two parts by an electrically insulating partitioning diaphragm which is provided with layer electrodes on both sides. Opposite the layer electrodes further electrodes are arranged on the main body of the sensor in order to form two measuring capacitors. In response to a temperature variation, the dielectric constant of the liquid changes and hence also the capacitance of each measuring capacitor. In order to compensate for this temperature error, use is made of the sum of the measurement signals which depends on the temperature to the same extent as the difference between the measurement signals but which, however, are independent of the differential pressure. The differential pressure $\Delta P$ can thus be determined by means of the following equation:

$$\Delta P = \frac{K0(1/C1 - 1/C2 + K1)}{1/C1 + 1/C2} \tag{1}$$

The constant K1 describes the temperature-dependent zero shift and the constant K0 represents a proportionality constant. The circuit arrangement for temperature compensation in a two-chamber differential pressure sensor comprises two measuring integrators, the feedback branch of which includes a respective measuring capacitor. The capacitance values which vary as a function of the differential pressure to be detected are applied as measurement signals to a negative feedback circuit by the measuring integrators, which negative feedback circuit sums the measurement signals in order to form a control signal that is applied to a comparator for comparison with a reference value. The difference between the control signal and the reference value signal is applied to a controller which controls an oscillator which applies an activation signal to the measuring integrators. Control is realised so that the amplitudes of the measurement signals remain constant, also in the case of a variation of the capacitances of the measuring capacitors due to a temperature variation, as a result of a variation of the frequency and/or the amplitude of the activation signal. As a result, the differential pressure measurement value calculated from the activation signals by an arithmetic device also remains constant, despite a temperature variation of the liquid.

The single-chamber differential pressure sensor, however, consists of two electrically conductive diaphragms which enclose a cavity filled with a liquid. The diaphragms constitute a respective measuring capacitor, in conjunction with respective, oppositely situated layer electrodes provided on a main body. The temperature dependency of the difference between and the sum of the reciprocal capacitance values of the measuring capacitors is not the same. This dependency can be expressed by the following equations:

$$1/C1 + 1/C2 = e + f\Delta T \tag{2}$$

$$1/C1 - 1/C2 = a + b\,T + (C + d\Delta T)\,\Delta P \tag{3}$$

where a, b, c, d, e and f are constants, $\Delta T$ is the difference between a reference temperature and the operating temperature, and $\Delta P$ is the pressure difference. The determination of the constants a, b, c, d, e and f is disclosed in the cited document DE-PS 33 40 834. Using the equations (2) and (3), the following is obtained for the differential pressure:

$$\Delta P = \frac{K2 + K3\,1/C1 - K4\,1/C2}{K5 + K6\,(1/C1 + 1/C2)} \tag{4}$$

where
K2 = b e − a f
K3 = f − b
K4 = f + b
K5 = c f − d e
K6 = d

The circuit arrangement for temperature compensation in a single-chamber differential pressure sensor comprises not only the two measuring integrators but also an additional reference integrator, without which the effect of the temperature-dependent term $c + d\Delta T$ cannot be eliminated. In the negative feedback circuit further arithmetical operations are performed, in addition to the summing of the two measurement signals, in order to generate the control signal to be compared with the reference value signal. The controller controls the oscillator supplying the activation signal for the measuring integrators and the reference integrator so that in the case of a temperature-imposed variation of the capacitance values of the measuring capacitors the amplitudes of the measurement signals remain constant under the influence of a variation of the frequency and/or the amplitude of the activation signal. The temperature-independent differential pressure is determined in a subsequent arithmetic device.

For forming a reference signal, the negative feedback circuit utilises a plurality of adders and multipliers. In order to form an activation signal it comprises a comparator, a controller and an oscillator.

For pressure sensors which do not operate on the basis of the differential pressure principle, the principle of the cited circuit arrangement (DE-PS 33 40 834) can also be used for temperature compensation. Such pressure sensors comprise at least one electrode which is arranged on a main body and whose counter electrode is provided on the diaphragm. In order to enable temperature compensation, in addition to the first measuring capacitor thus formed there is realised a further measuring capacitor which is constructed as a reference capacitor and which is formed by an electrode on the diaphragm and a counter-electrode on the main body. The measurement signals obtained by means of the measuring integrators can be applied to the negative feedback circuit, either individually or as a sum, for temperature compensation.

SUMMARY OF THE INVENTION

Therefore, it is an object of the invention to provide a circuit arrangement for temperature compensation of capacitive pressure sensors and differential pressure sensors which comprises a simple negative feedback circuit.

In a circuit arrangement of the kind set forth this object is achieved in that the negative feedback circuit comprises a Schmitt trigger circuit which generates a rectangular activation signal.

The negative feedback circuit of the circuit arrangement in accordance with the invention comprises only a Schmitt trigger circuit in addition to a summing device, if any. A triangular sum signal which originates from the summed measurement signals in the differential pressure sensors and, for example, from the measurement signal derived from the reference capacitor in another pressure sensor which does not operate on the basis of the differential pressure principle, is applied to the Schmitt trigger circuit which in response forms a rectangular activation signal for the measuring integrators. The switching thresholds of the Schmitt trigger circuit are preset. When the sum signal increases, the output signal of the Schmitt trigger circuit is changed when a switching threshold is reached, for example the rectangular activation signal changes from a low to a high value. Under the influence of the switch over, the sum signal subsequently decreases. When the other switching threshold is reached, the output signal of the Schmitt trigger circuit is changed again. For example, the activation signal changes over from a high value to a low value. The rectangular activation signal is thus controlled in dependence on the sum signal.

For compensating the temperature effect, a sum signal is formed which depends on the temperature but not on the pressure. For example, in a differential pressure sensor, the sum of the measurement signals wherefrom the sum signal is derived depends on the temperature but not on the differential pressure.

When the temperature changes, the slope of the triangular measurement signal changes. However, a switching threshold of the Schmitt trigger circuit is then reached at a different instant. For example, in the case of a steeper slope the switching threshold is reached sooner in comparison with the state prior to the change of the temperature. As a result, the frequency of the activation signal or the measurement signals changes to the same extent as the temperature, but not the amplitude of the activation signals.

In the differential pressure sensor the differential pressure value is determined from the measurement signals by differentiation. Because the amplitudes of the measurement signals remain constant in response to a temperature variation as a result of the presence of the Schmitt trigger circuit, for a constant differential pressure the differential pressure value calculated from the measurement signals also remains substantially constant, except for a component which originates from a temperature dependent zero shift, despite a variation of the temperature.

The sum of the measurement signals is formed in the differential pressure sensor. This summing operation can be performed, for example, by an operational amplifier which is constructed as a summing device. The Schmitt trigger circuit which receives the sum signal may also consist of an operational amplifier comprising a positive feedback resistance network. In another construction of the Schmitt trigger circuit, it comprises a switch for generating the rectangular activation signal by switching over between two signal levels on its output. The switch output is connected, via a positive feedback resistor, to a control input of which the switch control input is coupled, via a resistor, to an output of at least one measuring integrator.

In this Schmitt trigger circuit the two signal levels should preferably be the same as regards the absolute value but should have a different sign (polarity). Preferably, the switching thresholds are then situated at the value zero. Because of the positive feedback via the positive feedback resistor, part of the activation signal is then added to the control signal. An increase of the triangular measurement signals then takes place from a negative value to zero. Subsequently, the switch is switched over. After switching over, the signal on the control input assumes a positive value because of the positive feedback. This value is reduced to the value zero by the decreasing triangular measurement signals. Subsequently, switch over takes place again and a negative value will again be present on the control input of the switch. The Schmitt trigger circuit comprising a switch can be simply realised and has short response times.

In comparison with the two-chamber differential pressure sensor, in a single-chamber differential pressure sensor an additional dependency on the temperature exists, which dependency is expressed by the term $c + d\Delta T$ of the equation (3). Therefore, in order to achieve full compensation for the temperature error of the single-chamber differential pressure sensor a reference integrator is provided which receives the activation signal from the Schmitt trigger circuit which now generates the activation signal from the sum of the measurement signals and the reference signal generated by the reference integrator. In pressure sensors which do not operate according to the differential pressure principle, such a reference integrator may also be required in order to compensate for an additional temperature dependency. It may then also be necessary to invert the activation signal by means of an inverter and to apply the inverted activation signal to the measuring integrators and the reference integrator.

In order to obtain a differential pressure value, the difference between the rectangular measurement signals and a zero correction are formed in an arithmetic device, a DC signal being derived therefrom in a rectification circuit, which DC signal is proportional to the differential pressure. In the arithmetic device the difference between the measurement signals is formed and additionally a temperaturedependent zero correction is performed. The output signal of the arithmetic device forms an activation signal which can be converted into a DC signal by rectification of the differential pressure value by means of a rectification operation.

In a further embodiment in accordance with the invention, the rectification circuit comprises a demultiplexer which applies the positive halfwave of the output of the arithmetic device to a first mean value forming device and the negative halfwave to a second mean value forming device, and also comprises a differentiating member which forms the difference between the output signals of the mean value forming devices. This rectification circuit offers the advantage that offset of the output signal of the arithmetic device is suppressed and that a variation of the switching thresholds of the demultiplexer does not have an effect.

BRIEF DESCRIPTION OF THE DRAWINGS

Embodiments in accordance with the invention will be described in detail hereinafter with reference to the accompanying in which drawings, FIG. 1 shows a block diagram of a circuit arrangement for temperature compensation of a capacitive differential pressure sensor, FIG. 2 diagrammatically shows signals which occur in the circuit arrangement shown in FIG. 1, FIG. 3 is a detailed representation of the circuit arrangement shown in FIG. 1, and FIG. 4 diagrammatically shows signals which occur in the rectification circuit shown in FIG. 3.

DESCRIPTION OF THE PREFERRED EMBODIMENTS

The circuit arrangement shown in FIG. 1 serves for temperature compensation during determination of a differential pressure by means of a single-chamber differential pressure sensor. Such a single-chamber differential pressure sensor comprises two diaphragms which are provided with layer electrodes and which form measuring capacitors 1 and 2 in conjunction with layer electrodes provided on a main body. The measuring capacitors 1 and 2 are shown in FIG. 1 and have a capacitance C1, C2, respectively. The diaphragms of the differential pressure sensor tightly seal a cavity filled with an incompressible liquid, for example, silicon oil.

The circuit arrangement shown in FIG. 1 comprises a respective measuring integrator 3, 4 for each measuring capacitor 1, 2. The measuring integrators receive a rectangular activation signal from a Schmitt trigger circuit 5. The activation signal is also applied to a reference integrator 6 which comprises a capacitor 7 having a capacitance C0. The two measurement signals from the measuring integrators 3 and 4 and the output signal of the reference integrator 6 are applied not only to the Schmitt trigger circuit 5 but also to an arithmetic device 8. In the Schmitt trigger circuit 5 the triangular measurement signals and the triangular output signal of the reference integrator 6 are added and converted into a rectangular drive signal. Furthermore, the measurement signals and the output signal of the reference integrator 6 are combined in the arithmetic device while taking into account the temperature-dependent zero shift. The output of the arithmetic device 8 is connected to an input of a rectification member 9 which generates a DC signal from the triangular output signal of the arithmetic device 8, which DC signal is a measure of the differential pressure value. The rectification member also receives the output signal of the reference integrator 6.

The Schmitt trigger circuit 5 comprises a switch 10, one input of which carries the negative signal level −U0, its other input carrying the positive signal level +U0. In dependence on the signal on its control input 11, the switch connects one input to its output. The output signal of the switch 10 represents the rectangular activation signal. The summing device is realised by means of three resistors 12, 13 and 14 having a common connection. The measurement signal of the measuring integrator 3 is applied to a common connection 15 via the resistor 12, the measurement signal of the measuring integrator 4 being applied thereto via a resistor 13, while the output signal of the reference integrator 6 is applied thereto via a resistor 14. The connection 15 is also connected to the control input 11 of the switch 10. The output of the switch 10 is also connected, via a resistor 16, to the connection 15. The Schmitt trigger circuit 5 influences the measurement signals so that they do not exhibit a temperature dependency except for the temperature dependency of the zero shift. This temperature-dependent zero shift is corrected in the arithmetic device 8.

The operation of the Schmitt trigger circuit 5, the measuring integrators 3 and 4 and the reference integrator 6 will be described in detail hereinafter with reference to FIG. 2. First of all it is assumed that the switch supplies an activation signal whose signal level has just been changed. For example, the output voltage U5 of the switch 10 has the voltage level −U0. On the connection 15 there is then formed a voltage which consists of a sum signal formed from the sum of the two measurement signals and the reference signal, and there is formed a signal which is derived from the voltage U5 by positive feedback via the positive feedback resistor 16. Because the measuring integrators 3 and 4 and the reference integrator 6 are inverting integrators, two linearly increasing measurement voltages U1 and U2 and a linearly increasing reference voltage U3 are formed from the negative voltage U5 by integration. FIG. 2 shows, by way of example, only the qualitative variation of the measurement voltage U1. Subsequent to the switching over from the positive voltage +U0 to the negative voltage −U0, a negative voltage U4 is formed on the connection 15 by the positive feedback. Because of the increasing of the measurement voltage and the reference voltage, the voltage U4 on the connection 15 will increase linearly. When the voltage U4 reaches zero, the switch 10 is switched over and the output of the switch 10 carries the voltage +U0. Because of the positive feedback, the positive voltage U4 appears on the connection 15. This voltage is then reduced to zero by the measurement voltages and the reference voltage. Subsequently, the switch again switches over from the positive voltage +U0 to the negative voltage −U0. The period of time elapsing between two switching operations is referred to as the period duration T.

The summing of the measurement signals results in a signal which depends on the temperature but not on the pressure. When the temperature changes, the capacitance of the measuring capacitors 1 and 2 also changes. This results in, for example, an increase of the slope of the triangular measurement signals. As a result, the switching threshold of the switch 10 is reached at an earlier instant than before the temperature change. As a result, the frequency of the activation signal or the measurement signals increases. The frequency of the activation signals or the measurement signals, therefore, is changed in proportion to the change of the temperature. The amplitude of the activation signals is not changed. The temperature dependency of the single-chamber differential pressure sensor, however, cannot be compensated merely by summing the measurement signals; Additionally a reference signal must be taken into account. This is because the term $c + d\Delta T$ in the above equation (3) cannot be compensated without an additional reference integrator. The constants c and d of this term are present in the denominator of the equation (4) which is again stated hereinafter and which is calculated from the equations (2) and (3):

$$\Delta P = \frac{K2 + K3\ 1/C1 - K4\ 1/C2}{K5 + K6\ (1/C1 + 1/C2)} \quad (4)$$

In order to compensate for the temperature-dependent term, the denominator of the equation (4) is realised by means of the Schmitt trigger circuit 5. The numerator is realised in the arithmetic device 8 in which the temperature-dependent zero shift is compensated for.

The relationship between the constants K5 and K6 will be illustrated hereinafter. The following equations can be derived from FIG. 1:

$$I4 = (U5 - U4)/R4 \quad (5)$$

$$I1 = (U4 - U1)/R1 \quad (6)$$

$$I2 = (U4 - U2)/R2 \quad (7)$$

$$I3 = (U4 - U3)/R3 \quad (8)$$

$$I4 = I1 + I2 + I3 \quad (9)$$

For the voltages U1, U2 and U3:

$$U1 = U5\ t\ R\ C1 \quad (10)$$

$$U2 = U5\ t\ R\ C2 \quad (11)$$

$$U3 = U5\ t\ R\ C0 \quad (12)$$

where t is the time and R is the respective value of a resistor in the measuring integrators 3 and 4 and the reference integrator 6. The equations (5) to (8) and the equations (10) to (12) are inserted into the equation (9). The equation thus obtained is taken for the period from $t=0$ to $t=ta$. At the instant ta, the switch-over point is reached. For this point, $U4=0$ and $U5=-U0$. The resultant equation is:

$$ta = \frac{1}{R9/(R6\ R\ C1) + R9/(R7\ R\ C2) + R9/(R8\ R\ C0)} \quad (13)$$

The duration from zero until the instant ta amounts to T/4.

In the arithmetic device 8 the voltages U1, U2 and U3 with the constants Ka, Kb and Kc are summed. The peak amplitude Us of the output signal of the arithmetic device 8 at the instant ta amounts to:

$$Us = U0\ ta\ (Ka/(R\ C1) + Kb/(R\ C2) + Kc/(R\ C0)) \quad (14)$$

The DC voltage Ua then formed in the rectification circuit 9, which is proportional to a pressure measurement value, is:

$$Ua = \frac{2\ U0\ (Ka/(R\ C1) + Kb/(R\ C2) + Kc/(R\ C0))}{R9/(R6\ R\ C1) + R9/(R7\ R\ C2) + R9/(R8\ R\ C0)} \quad (15)$$

The values searched for the constants K2 to K6 of the equation (4) are obtained by coefficient comparison of the coefficients in the equations (4) and (15):

$K2 = 2\ U0\ Kc/(R\ C0)$
$K3 = 2\ U0\ Ka/R$
$K4 = -2\ U0\ Kb/R$
$K5 = R9/(R8\ R\ C0)$
$K6 = R9/(R6\ R)$, where $R6 = R7$ FIG. 3 is a detailed representation of an embodiment of the circuit arrangement shown in FIG. 1. Each of the measuring integrators 3 and 4 consists of an operational amplifier 20, 21, a resistor 22, 23 which has the value R and which is connected to the inverting input, and measuring capacitors 1 and 2 which are connected in the feedback branch and which are associated with a respective lowpass filter 24, 25, respectively, which produce d.c. feedback in order to avoid integration of offsets. The non-inverting inputs of the operational amplifiers 20 and 21 are connected to ground.

The reference integrator 6 also comprises an operational amplifier 26 whose non-inverting input is connected to ground and whose inverting input is connected to a connection of a resistor 27 having the value R and to a connection of the capacitor 7. The other connection of the capacitor 7 is connected to the output of the operational amplifier 26 and to a connection of the resistor 14 and to connections of resistors 30 and 31 which are provided in the arithmetic device 8. The output of the operational amplifier 20 is connected to a connection of the resistor 12 and to a resistor 32 which is included in the arithmetic device. The other connections of the resistors 12, 13 and 14 are connected to the control input of the switch 10 and to one connection of the resistor 16, the other connection of which is connected to the output of the switch 10. The output of the switch 10 is also connected to the other connections of the resistors 22, 23 and 27.

The arithmetic device 8 also comprises an operational amplifier 34 whose non-inverting input is connected to the other connection of the resistor 31, to the other connection of the resistor 33 and to a further resistor 35 which is connected to ground. The other connections of the resistors 30 and 32, a resistor 36 which is connected to ground, and a resistor 37 which is included in the feedback branch are connected to the inverting input of the operational amplifier 34. The output of the operational amplifier 34 is connected to the other connection of the resistor 37. The constants Ka, Kb and Kc are realised by means of the resistors 30 to 33 and 35 to 37.

The output of the arithmetic device 8, also being the output of the operational amplifier 34, is connected to the input of a demultiplexer 40 which is included in the rectification circuit 9. A first output of the demultiplexer 40 is connected to a mean-value forming device 41 which consists of a resistor 42 and a capacitor 43. The resistor 42 is connected between the first output of the demultiplexer 40 and the non-inverting input of an operational amplifier 53. The capacitor 43, being connected to ground, is connected to the non-inverting input of the operational amplifier 53. The other output of the demultiplexer is connected to a mean-value forming device 45 which also comprises a resistor 46 and a capacitor 47. One connection of the resistor 46 is connected to the second output of the demultiplexer 40. The other connection of the resistor 46 is connected to the capacitor 47, being connected to ground, and to the non-inverting input of an operational amplifier 48. To the inverting input of the operational amplifier 48 there are connected a resistor 49, being connected to ground, and a resistor 50 which is connected to its output. The output of the operational amplifier 48 is also connected to one connection of a resistor 51 whose other connection is connected to the inverting input of the operational amplifier 53 and to a connection of a resistor 52 whose other connection is connected to the output of the operational amplifier 53. The output of the operational amplifier 53 also constitutes the output of the rectification circuit 9. The demultiplexer is controlled by the output signal of the reference integrator 6.

During a positive halfwave of the triangular output signal of the arithmetic device 8, the input of the demultiplexer 40 is connected to the mean-value forming device 41. During the negative halfwave of the triangular output signal of the arithmetic device 8, the mean-value forming device 45 is connected to the input of the demultiplexer 40. The mean value of the relevant halfwave, corresponding to half the peak amplitude of the triangular output signal of the arithmetic device 8, is present on the output of the two demultiplexers. The operational amplifiers 53 and 48 and the resistors 49 to 52 form a differentiating member whose output, i.e. the output of the operational amplifier 53, supplies the difference between the two averaged signals of the mean-value forming devices 41 and 45. FIG. 4 also shows the voltages U6 (input from mean-value forming device 41) and U7 (input from mean-value forming device 45) occurring on the inputs of the mean value forming devices.

The circuit arrangement shown in FIG. 1 can also be used for temperature compensation for a two-chamber differential pressure sensor or a pressure sensor which does not operate on the basis of the differential pressure principle. When the circuit arrangement is to be used for a two-chamber differential pressure sensor, the reference integrator can be omitted. For a pressure sensor which does not operate on the basis of the differential pressure principle, it may be necessary to apply the inverted activation signal to the inputs of the measuring integrators 3 and 4 or to the reference integrator 6 via an inverter 55. This is the case, for example, when the pressure sensor is described by an equation where the constant K6 of the equation (4) has a negative sign. Such a negative sign may also occur in the equation (4) when an oil other than silicon oil is used in the single-chamber differential pressure sensor. In that case the inverter 55 is also required.

I claim:

1. A circuit arrangement for temperature compensation of capacitive pressure sensors and differential pressure sensors, comprising two measuring capacitors, each of which is connected in a respective feedback branch of two measuring integrators and whose capacitance values, varying as a function of the pressure or differential pressure to be detected, are converted into measurement signals by the measuring integrators, and a negative feedback circuit which generates a temperature-dependent actvation signal for the measuring integrators from at least one measurement signal, wherein the negative feedback circuit comprises a Schmitt trigger circuit which generates a rectangular activation signal.

2. A circuit arrangement as claimed in claim 1, wherein the Schmitt trigger circuit comprises a switch for deriving the rectangular activation signal by switching over to produce two signal levels at its output, said switch being connected, via a positive feedback resistor, to a control input which is coupled, via a resistor, to an output of at least one measuring integrator.

3. A circuit arrangement as claimed in claim 2 further comprising a reference integrator which receives the activation signal from the Schmitt trigger circuit, the Schmitt trigger circuit, forming the activation signal from the sum of the measurement signals and a reference signal supplied by the reference integrator.

4. A circuit arrangement as claimed in claim 3 further comprising an arithmetic device in which a difference signal is derived between triangular measurement signals and a zero correction signal, a DC signal which is proportional to the differential pressure being derived therefrom by rectification in a rectification circuit.

5. A circuit arrangement as claimed in claim 4, wherein, the rectification circuit comprises, a demultiplexer which applies a positive halfwave of an output signal of the arithmetic device to a first mean-value forming device and a negative halfwave thereof to a second mean-value forming device, and a differentiating member which forms a difference between output signals of the mean-value forming devices.

6. A circuit arrangement as claimed in claim 2, further comprising an arithmetic device coupled to outputs of said two measuring integrators and including means for deriving a difference signal between triangular measurement signals supplied by the measuring integrators and a zero correction signal, and a rectification circuit coupled to an output of the arithmetic device for producing a DC signal proportional to the differential pressure.

7. A circuit arrangement as claimed in claim 1, further comprising a reference integrator which receives the activation signal from the Schmitt trigger circuit, the Schmitt trigger circuit forming the activation signal from the sum of the measurement signals and a reference signal supplied by the reference integrator.

8. A circuit arrangement as claimed in claim 1, further comprising an arithmetic device coupled to outputs of said two measuring integrators and including means for deriving a difference signal between triangular measurement signals supplied by the measuring integrators and a zero correction signal and a rectification circuit coupled to an output of the arithmetic device for producing a DC signal proportional to the differential pressure.

9. A circuit arrangement as claimed in claim 8, wherein the rectification circuit comprises, a demultiplexer which applies a positive halfwave of an output signal of the arithmetic device to a first mean-value forming device and a negative halfwave thereof to a second mean-value forming device, and a differentiating member which forms a difference signal between output signals of the mean-value forming devices.

10. A circuit for temperature compensated pressure measurement using capacitive pressure sensors and differential pressure sensors comprising:
first and second measuring capacitors whose capacitances vary as a function of the pressure or differential pressure to be measured,
first and second measuring integrators with said first and second measuring capacitors connected in respective feedback branches of the first and second measuring integrators, said first and second measuring integrators being operative to convert respective variations in the capacitance of its respective measuring capacitor into respective first and second measurement signals, and
a Schmitt trigger circuit connected in a negative feedback circuit between outputs and inputs of said first and second measuring integrators, wherein said Schmitt trigger circuit generates at its output a constant amplitude rectangular activation signal for said measuring integrators in response to said first and second measurement signals.

11. A circuit as claimed in claim 10, wherein said Schmitt trigger circuit includes means for summing said first and second measurement signals, said circuit further comprising:

an arithmetic device coupled to the outputs of said first and second measuring integrators and including an operational amplifier circuit connected to derive a difference signal with zero correction and which signal is determined by said first and second measurement signals.

12. A circuit as claimed in claim 10, wherein said Schmitt trigger circuit includes means for summing said first and second measurement signals, a switching device having input means coupled to first and second sources of voltage, an output coupled to said inputs of the first and second measuring integrators and via a positive feedback circuit to a control input of the switching device, said control input being further coupled to said summing means, and said circuit further comprising: an arithmetic device coupled to the outputs of said first and second measuring integrators and operative to produce an output signal determined at least by said first and second measurement signals.

13. A circuit as claimed in claim 12, further comprising:

a reference integrator having an input coupled to the output of the switching device to receive the activation signal and an output coupled to said summing means whereby the Schmitt trigger circuit generates the activation signal from the sum of the first and second measurement signals and a reference signal supplied by the output of the reference integrator, and means for coupling said output of the reference integrator to an input of said arithmetic device whereby said output signal is determined by said first and second measurement signals and by the reference signal.

14. A circuit as claimed in claim 10, wherein said Schmitt trigger circuit includes means for summing said first and second measurement signals, said circuit further comprising:

an arithmetic device coupled to the outputs of said first and second measuring integrators and operative to produce an output signal determined at least by said first and second measurement signals, a reference integrator having an input coupled to the output of the switching device to receive the activation signal and an output coupled to said summing means whereby the Schmitt trigger circuit generates the activation signal from the sum of the first and second measurement signals and a reference signal supplied by the output of the reference integrator, and means for coupling said output of the reference integrator to an input of said arithmetic device whereby said output signal is determined by said first and second measurement signals and by the reference signal.

15. A circuit as claimed in claim 10, further comprising:

an arithmetic device coupled to the outputs of said first and second measuring integrators and operative to produce an output signal determined at least by said first and second measurement signals, a switching device having an input which receives said output signal and first and second output terminals, first and second mean-value forming devices coupled to said first and second output terminals, respectively, and a differentiating circuit coupled to said first and second mean-value forming devices so as to produce a DC output signal determined by said pressure or differential pressure and independent of temperature.

16. A circuit as claimed in claim 15, wherein said Schmitt trigger circuit includes means for summing said first and second measurement signals, said circuit further comprising:

a reference integrator having an input responsive to said activation signal and an output coupled to said summing means whereby the Schmitt trigger circuit generates the activation signal from the sum of the first and second measurement signals and a reference signal supplied by the output of the reference integrator, and means coupling a control input of said switching device to the output of said reference integrator.

17. A circuit as claimed in claim 15, wherein said first and second mean-value forming devices comprise first and second RC circuits, respectively.

* * * * *

UNITED STATES PATENT AND TRADEMARK OFFICE
CERTIFICATE OF CORRECTION

PATENT NO. : 5,000,048
DATED : March 19, 1991
INVENTOR(S) : Jurgen Kordts It is certified that error appears in the above-identified patent and that said Letters Patent is hereby corrected as shown below:

On the title page:

IN THE ABSTRACT SECTION [57]
line 8, change "interconnect" to --integrators--.

IN THE CLAIMS
Claim 3, line 4, delete "," (comma).

Signed and Sealed this

Seventh Day of December, 1993

*Attest:*

BRUCE LEHMAN

*Attesting Officer*     Commissioner of Patents and Trademarks